US012064693B2

United States Patent
Wan et al.

(10) Patent No.: US 12,064,693 B2
(45) Date of Patent: Aug. 20, 2024

(54) VIRTUAL OBJECT SELECTION METHOD AND APPARATUS, DEVICE, AND STORAGE MEDIUM

(71) Applicant: TENCENT TECHNOLOGY (SHENZHEN) COMPANY LTD, Guangdong (CN)

(72) Inventors: Yu Lin Wan, Shenzhen (CN); Shan Dong Su, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 368 days.

(21) Appl. No.: 17/492,819

(22) Filed: Oct. 4, 2021

(65) Prior Publication Data

US 2022/0023760 A1    Jan. 27, 2022

Related U.S. Application Data

(63) Continuation of application No. PCT/CN2021/095052, filed on May 21, 2021.

(30) Foreign Application Priority Data

Jun. 5, 2020 (CN) .......................... 202010507561.6

(51) Int. Cl.
*A63F 13/56* (2014.01)
*A63F 13/42* (2014.01)
(Continued)

(52) U.S. Cl.
CPC .............. *A63F 13/56* (2014.09); *A63F 13/42* (2014.09); *A63F 13/422* (2014.09); *A63F 13/57* (2014.09);
(Continued)

(58) Field of Classification Search
CPC ........ A63F 13/56; A63F 13/42; A63F 13/422; A63F 13/57; A63F 13/837; A63F 2300/308; A63F 2300/807; G06F 3/04815
See application file for complete search history.

(56) References Cited

U.S. PATENT DOCUMENTS 6,652,384 B2 * 11/2003 Kondo ................. A63F 13/822
463/37
7,785,198 B2 * 8/2010 Kando ................. A63F 13/822
463/31
(Continued)

FOREIGN PATENT DOCUMENTS

CN    104915117 A    9/2015
CN    107837529 A    3/2018
(Continued)

OTHER PUBLICATIONS

Extended European Search Report dated Aug. 2, 2022 in European Application No. 21783123.9.
(Continued)

*Primary Examiner* — William H McCulloch, Jr.
(74) *Attorney, Agent, or Firm* — Sughrue Mion, PLLC

(57) ABSTRACT

Provided are a virtual object selection method and apparatus, a terminal, and a storage medium, belonging to the field of computer and Internet technologies. When a client controls a first virtual object to perform a first operation, and a plurality of second virtual objects are distributed densely in an execution range of the first operation, the client offsets logical positions of the plurality of second virtual objects to ensure that the plurality of second virtual objects may be distinguished and a target virtual object is selected from the plurality of second virtual objects based on offset logical positions. Accordingly, a user is prevented from spending much time to select the target virtual object from the
(Continued)

execution range of the first operation, thereby reducing operation time costs of the user and improving the operation efficiency.

20 Claims, 9 Drawing Sheets

(51) Int. Cl.
    *A63F 13/422*     (2014.01)
    *A63F 13/57*     (2014.01)
    *A63F 13/837*     (2014.01)
    *G06F 3/04815*     (2022.01)

(52) U.S. Cl.
    CPC ........ *A63F 13/837* (2014.09); *G06F 3/04815* (2013.01); *A63F 2300/308* (2013.01); *A63F 2300/807* (2013.01)

(56) References Cited

U.S. PATENT DOCUMENTS

| | | | | |
|---|---|---|---|---|
| 8,210,943 | B1* | 7/2012 | Woodard | A63F 13/69 463/2 |
| 8,342,926 | B2* | 1/2013 | Garvin | A63F 13/56 463/7 |
| 9,295,912 | B2* | 3/2016 | Garvin | A63F 13/837 |
| 10,035,064 | B2* | 7/2018 | Garvin | A63F 13/45 |
| 11,931,653 | B2* | 3/2024 | Jiang | A63F 13/533 |
| 2005/0221880 | A1* | 10/2005 | Kando | A63F 13/822 463/9 |
| 2010/0009733 | A1* | 1/2010 | Garvin | A63F 13/10 463/37 |
| 2020/0054947 | A1* | 2/2020 | Wu | A63F 13/537 |
| 2020/0282308 | A1* | 9/2020 | Guo | A63F 13/537 |
| 2021/0146248 | A1* | 5/2021 | Chen | A63F 13/837 |
| 2022/0023760 | A1* | 1/2022 | Wan | A63F 13/837 |
| 2022/0032188 | A1* | 2/2022 | Wan | G06F 3/04842 |
| 2022/0032195 | A1* | 2/2022 | Wan | A63F 13/533 |
| 2022/0035515 | A1* | 2/2022 | Wan | G06F 3/04842 |
| 2022/0043562 | A1* | 2/2022 | Wan | A63F 13/2145 |
| 2022/0258056 | A1* | 8/2022 | Jiang | A63F 13/42 |

FOREIGN PATENT DOCUMENTS

| | | |
|---|---|---|
| CN | 109513209 A | 3/2019 |
| CN | 109771941 A | 5/2019 |
| CN | 110433493 A | 11/2019 |
| CN | 111672117 A | 9/2020 |

OTHER PUBLICATIONS

Translation of the International Search Report dated Aug. 18, 2021 in International Application No. PCT/CN2021/095052.
Written Opinion dated Feb. 20, 2023 issued by the Intellectual Property Office of Singapore in Application No. 11202112325Y.
International Search Report for PCT/CN2021/095052 dated Aug. 18, 2021 (PCT/ISA/210).
Written Opinion for PCT/CN2021/095052 dated Aug. 18, 2021 (PCT/ISA/237).

* cited by examiner though the user may determine an execution range of the skill by touching the operation button, and then client selects the target virtual object from the execution range of the skill according to a rule and casts the skill.

VIRTUAL OBJECT SELECTION METHOD AND APPARATUS, DEVICE, AND STORAGE MEDIUM

CROSS-REFERENCE TO RELATED APPLICATION(S)

This application is a continuation application of International Application No. PCT/CN2021/095052, filed May 21, 2021, which claims priority to Chinese Patent Application No. 202010507561.6, filed with the China National Intellectual Property Administration on Jun. 5, 2020, the disclosures of which are incorporated by reference in their entireties.

FIELD

Embodiments of the disclosure relate to the field of computer and Internet technologies, and in particular, to a virtual object selection method and apparatus, a device, and a storage medium.

BACKGROUND

In a multiplayer online battle arena (MOBA) game, a user may log in to a client of the MOBA game to control a virtual object corresponding to the user in a virtual environment.

In the related art, the user may control the virtual object corresponding to the user to cast a particular skill, and the skill may produce an effect such as damage to a target virtual object in the virtual environment. In the related art, in a user interface displayed by the client, each skill corresponds to an operation button, and the user may actively select the target virtual object by touching the operation button. For example, the user may determine an execution range of the skill by touching the operation button, and then client selects the target virtual object from the execution range of the skill according to a rule and casts the skill.

SUMMARY

An embodiment of the disclosure provides a virtual object selection method, including:

displaying a user interface, the user interface comprising an image corresponding to a virtual environment and a first virtual object located in the virtual environment;

obtaining, based on a first operation being performed by the first virtual object, an execution range of the first operation of the first virtual object in the virtual environment;

offsetting, based on a density of a plurality of second virtual objects in the execution range satisfying a first condition, a logical position of at least one second virtual object in the plurality of second virtual objects, to obtain an offset logical position of the at least one second virtual object, the logical position being a position used in processing the at least one second virtual object in a logical layer; and selecting a target virtual object, on which the first operation is performed, from the plurality of second virtual objects based on the offset logical position of the at least one second virtual object.

An embodiment of the disclosure further provides a virtual object selection apparatus, including:

at least one memory configured to store program code; and at least one processor configured to read the program code and operate as instructed by the program code, the program code including:

user interface display code configured to cause the at least one processor to display a user interface, the user interface including an image corresponding to a virtual environment and a first virtual object located in the virtual environment;

execution range obtaining code configured to cause the at least one processor to, based on a first operation being performed by the first virtual object, obtain an execution range of the first operation of the first virtual object in the virtual environment;

logical position offset code configured to cause the at least one processor to offset, based on a density of a plurality of second virtual objects in the execution range satisfying a first condition, a logical position of at least one second virtual object in the plurality of second virtual objects, to obtain an offset logical position of the at least one second virtual object, the logical position being a position used in processing the at least one second virtual object in a logical layer; and target object selection code configured to cause the at least one processor to select a target virtual object, on which the first operation is performed, from the plurality of second virtual objects based on the offset logical position of the at least one second virtual object An embodiment of the disclosure provides a terminal, including a processor and a memory, the memory storing at least one instruction, at least one program, a code set, or an instruction set, the at least one instruction, the at least one program, the code set, or the instruction set being loaded and executed by the processor to implement the virtual object selection method.

An embodiment of the disclosure provides a non-transitory computer-readable storage medium, storing at least one instruction, at least one program, a code set or an instruction set, the at least one instruction, the at least one program, the code set or the instruction set being loaded and executed by a processor to implement the virtual object selection method.

A computer program product is provided, the computer program product, when run on terminal, causing the terminal to perform the virtual object selection method.

BRIEF DESCRIPTION OF THE DRAWINGS

To describe the technical solutions in the example embodiments of the disclosure more clearly, the following briefly introduces the accompanying drawings required for describing the embodiments. The accompanying drawings in the following description show only some embodiments of the disclosure, and a person of ordinary skill in the art may still derive other accompanying drawings from these accompanying drawings without creative efforts.

DETAILED DESCRIPTION

To make the objectives, technical solutions, and advantages of the disclosure clearer, implementations of the disclosure are further described below in detail with reference to the accompanying drawings.

In the related art, when a user controls a virtual object corresponding to the user in a virtual environment to cast a skill, and when there are a plurality of virtual objects in an execution range of the skill, the user needs to spend a substantial amount of time to manipulate (e.g., touch) an operation button corresponding to the skill, to ensure that a target virtual object selected by a client in the execution range of the skill is a target virtual object required by the user, resulting in increasing of operation costs of the user.

Embodiments of the disclosure provide a virtual object selection method and apparatus, a terminal, and a storage medium, which may be used for reducing operation time costs of the user and improving the operation efficiency in utilizing an electronic device (e.g., terminal device).

Figure 1:
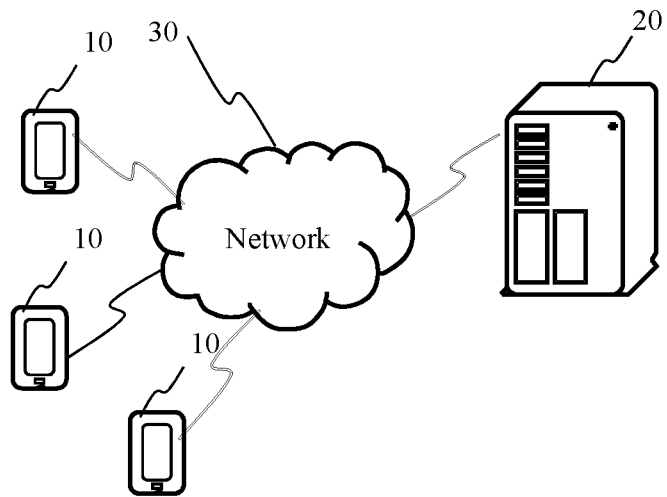
FIG. 1 is a schematic diagram of an application run environment according to an embodiment of the disclosure.

FIG. 1 is a schematic of an application run environment to which a virtual object selection method is applicable according to an embodiment of the disclosure. The application run environment may include a terminal 10 and a server 20.

The terminal 10 may be an electronic device such as a mobile phone, a tablet computer, a game console, an e-book reader, a multimedia player, a wearable device, and a personal computer (PC). A client of an application may be installed on the terminal 10.

In this embodiment of the disclosure, the application may be any application that can provide a virtual environment for a virtual object that is substituted and operated by a user to move in the virtual environment. The application may be a game application, for example, a multiplayer online battle arena (MOBA) game, a battle royale (BR) game, a third-person shooting (TPS) game, a first-person shooting (FPS) game, or a multiplayer shooting survival game. In addition to the game applications, the virtual object may also be presented to a user and provided with a corresponding function in applications of another type, for example, a virtual reality (VR) application, an augmented reality (AR) application, a three-dimensional map program, a military simulation program, a social application, and an interactive entertainment application. This is not limited in the embodiments of the disclosure. The form and corresponding function of the virtual object vary with different applications, and may be preset according to an actual requirement. This is not limited in the embodiments of the disclosure. A client of the application runs in the terminal 10. In some embodiments, the application is an application developed based on a three-dimensional virtual environment engine, for example, the virtual environment engine is a unity engine. The virtual environment engine may build a three-dimensional virtual environment, a virtual object, a virtual prop, and the like and bring more immersive game experience to the user.

The virtual environment is a scene displayed (or provided) when a client of an application (for example, a game application) runs on a terminal. The virtual environment refers to a scene, for example, a virtual house, a virtual island, a virtual map, or a virtual building, created for a virtual object to perform activities (for example, game competition). The virtual environment may be a simulated environment of a real world, or may be a semi-simulated semi-fictional environment, or may be an entirely fictional environment. The virtual environment may be a two-dimensional virtual environment, a 2.5-dimensional virtual environment, or a three-dimensional virtual environment. This is not limited in the embodiments of the disclosure.

The virtual object may be a virtual role controlled by a user account in an application or may be a virtual role controlled by a computer program in an application. For example, the application is a game application, and the virtual object may be a game role controlled by a user account in the game application, or may be a game monster controlled by a computer program in the game application. The virtual object may be in a human form, an animal form, a cartoon form, or another form. This is not limited in the embodiments of the disclosure. The virtual object may be presented in a three-dimensional form or a two-dimensional form, which is not limited in the embodiments of the disclosure. When the virtual environment is a three-dimensional virtual environment, the virtual object may be a three-dimensional model created based on a skeletal animation technology. Each virtual object has a shape and a size in the three-dimensional virtual environment, and occupies some space in the three-dimensional virtual environment. In this embodiment of the disclosure, the terminal 10 may receive an operation of a virtual object, determine an effective execution range according to a set execution range of the operation and a visible boundary range in a virtual environment, and then select (e.g., without a user operation to select) a target virtual object corresponding to the operation from the effective execution range.

In an example embodiment, the virtual objects include virtual objects in the same camp and virtual objects in different camps, that is, in an application, the virtual objects are divided into different camps. For example, a MOBA game is used as an example, and 10 users are matched for a game and are divided into two teams of a red team and a blue team, that is, every five people are in a group. In this case, the red team and virtual objects in the red team are in the same camp and are in a teammate relationship with each other, the blue team and virtual objects in the blue team are in the same camp and are in a teammate relationship with each other, and the virtual objects in the red team and the virtual objects in the blue team are in different camps and are in a hostile relationship with each other.

The server 20 is configured to provide a back-end service to a client of an application in the terminal 10. For example, the server 20 may be a back-end server of the application. The server 20 may be one server, a server cluster including a plurality of servers, or a cloud computing service center. The server 20 is configured to provide back-end services to applications in the plurality of terminals 10 at the same time.

In some embodiments, the terminal 10 may communicate with the server 20 through a network 30. The network may be a wire network or may be a wireless network. This is not limited in this embodiment of the disclosure.

Figure 2:
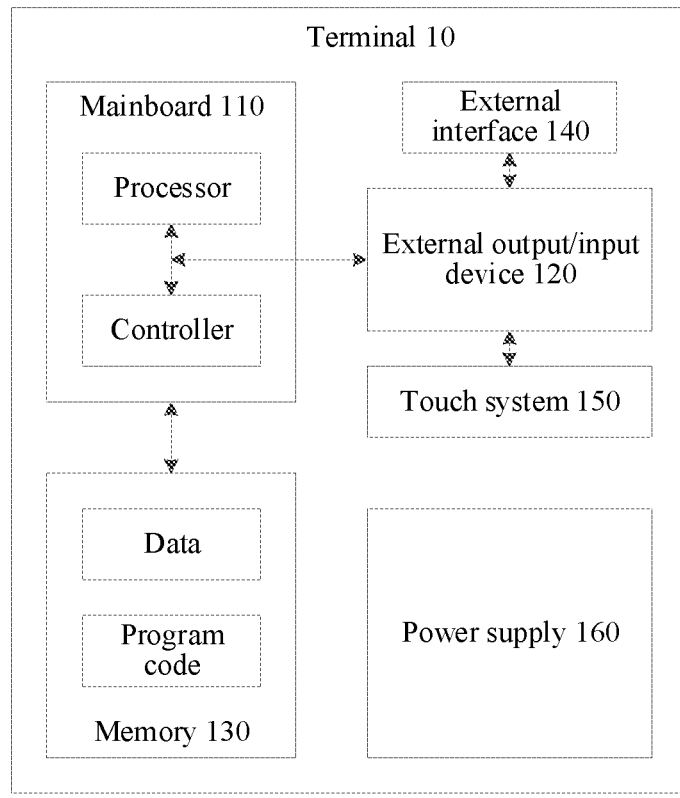
FIG. 2 is a schematic structural diagram of a terminal according to an embodiment of the disclosure.

FIG. 2 is a schematic structural diagram of a terminal according to an embodiment of the disclosure. The terminal 10 may include a mainboard 110, an external output/input device 120, a memory 130, an external interface 140, a touch system 150, and a power supply 160.

Processing elements such as a processor and a controller are integrated in the mainboard 110.

In some embodiments, for a terminal, the external output/input device 120 may include a display component (for example, a display screen), a sound playback component (for example, a speaker), a sound collecting component (for example, a microphone), various buttons, and the like. For a PC terminal, the external output/input device 120 may include a display component (for example, a display screen), a sound playback component (for example, a speaker), a sound collecting component (for example, a microphone), various buttons (for example, a mouse and a keyboard), and the like.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the terminal 10.

In this embodiment of the disclosure, the processor in the mainboard 110 may generate a user interface (for example, a game interface) by executing or invoking the program code and the data stored in the memory, and present the generated user interface (for example, the game interface) by using the external output/input device 120. During presentation of the user interface (for example, the game interface), a touch operation performed during interaction between the user and the user interface (for example, the game interface) may be detected through the touch system 150, and a response is made to the touch operation.

Figure 3:
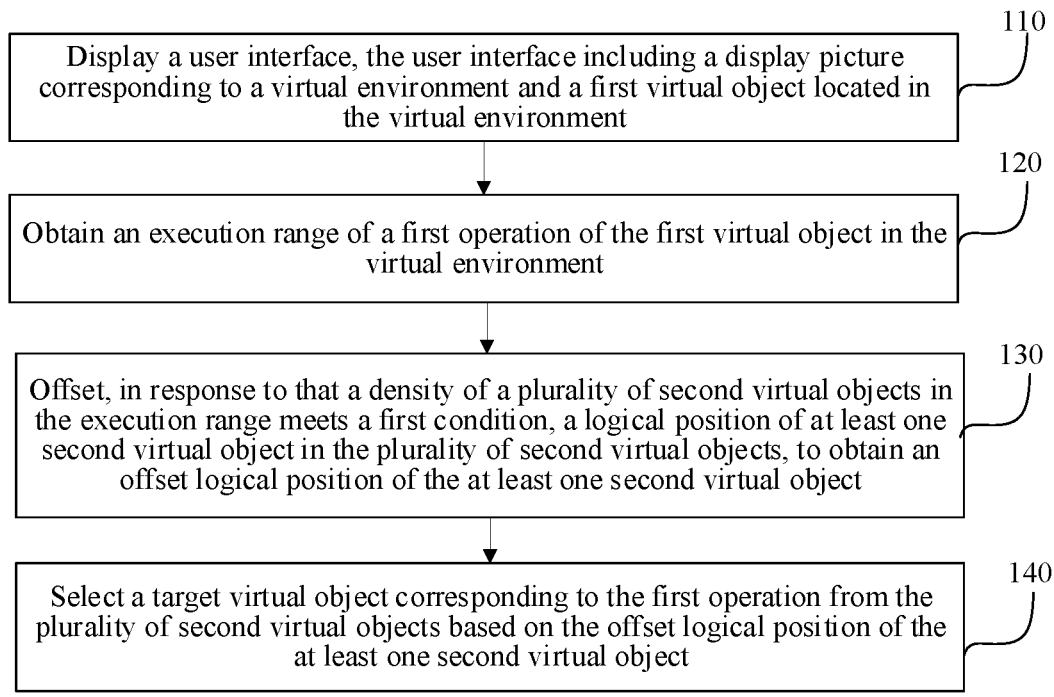
FIG. 3 is a flowchart of a virtual object selection method according to an embodiment of the disclosure.

FIG. 3 is a flowchart of a virtual object selection method according to an embodiment of the disclosure. The method is applicable to a client of the application, for example, applicable to the client (hereinafter referred to as the "client") installed on the terminal 10 in the application run environment shown in FIG. 1. The method may include the following operations 110 to 140.

Operation 110. Display a user interface, the user interface including a display picture corresponding to a virtual environment and a first virtual object located in the virtual environment.

The user interface refers to an image (e.g., a picture) of an application displayed by a client to a user, and the application may be a computer program that needs to be downloaded and installed or may be a click-to-use computer program. In some embodiments, the application may be any application that can provide a virtual environment, for example, a game application. The user interface includes a display picture of the virtual environment. The display picture may include a virtual item and a virtual object, for example, a virtual character, a virtual building, a virtual environment, and a virtual map. A user may control a first virtual object to interact with virtual items or virtual objects in the virtual environment.

In this embodiment of the disclosure, when receiving a start instruction of an application triggered by the user, the client may control running of the application and display a user interface corresponding to the application. The user interface includes a display image (e.g., picture) corresponding to a virtual environment and a first virtual object in the virtual environment, and the first virtual object may be a virtual object controlled by the user. The first virtual object may be in a human form, an animal form, a cartoon form, or another form. This is not limited in the embodiments of the disclosure. In this embodiment of the disclosure, the first virtual object may be presented in a three-dimensional form or a two-dimensional form.

Operation 120. Obtain an execution range of a first operation of the first virtual object in the virtual environment.

The first operation is any interactive operation between the first virtual object and the virtual environment. For example, the first operation is a skill casting operation of the first virtual object or a normal attack operation of the first virtual object. An acted target corresponding to the interactive operation may be a virtual item in the virtual environment or may be another virtual object in the virtual environment. This is not limited in this embodiment of the disclosure.

In an example, the first operation is triggered by the first virtual object controlled by the user. For example, the user may trigger a trigger instruction of the first operation by clicking a corresponding icon or pressing a corresponding key, and then after receiving the trigger instruction, the client controls the first virtual object to perform the first operation.

In another example, the first operation is triggered by the first virtual object controlled by the computer program. For example, after running the application, the client may control, according to a preset rule, the first virtual object to perform the first operation.

The preset rule may be set flexibly. For example, the preset rule includes an online duration of the first virtual object. The client may detect the online duration of the first virtual object, and if the online duration of the first virtual object meets a condition, control the first virtual object to perform the first operation. In another example, the preset rule includes an attribute parameter of the first virtual object. The client may detect the attribute parameter of the first virtual object, and if one or more attribute parameters of the first virtual object meet a condition, control the first virtual object to perform the first operation. The attribute parameter may include a life value, a defense value, an attack speed, or the like. This is not limited in this embodiment of the disclosure. Alternatively, the preset rule includes an operation parameter of the first virtual object. The client may detect the operation parameter of the first virtual object, and if the operation parameter of the first virtual object meets a condition, control the first virtual object to perform the first operation. The operation parameter may be a quantity of a virtual item (e.g., monster in a game) that is defeated, a quantity of times of skill casting, a quantity of uses of an item, or the like. This is not limited in this embodiment of the disclosure. The description of the preset rule is merely exemplary and explanatory. In an actual application, the preset rule may be flexibly set according to an actual situation.

The execution range is a function range of the first operation, and execution ranges corresponding to different first operations may be different. In this embodiment of the disclosure, after displaying the user interface, the client may obtain an execution range of the first operation of the first virtual object in the virtual environment. A shape of the execution range may be a circle, a fan shape, a rectangle, or a triangle. This is not limited in this embodiment of the disclosure. In some embodiments, the execution range is a selected execution range, that is, a position of the execution range may be autonomously selected by a user.

In an example, a radius of the execution range is a preset radius, and the preset radius is set by a designer or a user. For example, the radius of the execution range includes an operation skill range and an additional range parameter. The operation skill range is a skill range corresponding to the first operation, and the additional range parameter is a range parameter Y set outside the operation skill range when virtual objects are searched for. The execution range may be a circular region with a sum of the operation skill range and the additional range parameter (the skill range+Y) as a radius. A circle center of the execution range is a focus point of the first operation. When the user autonomously selects the position of the execution range, the user may select the position of the execution range by manipulating (e.g., touching) an operation button in the user interface and moving the operation button. When the user touches the operation button, the client may obtain an initial position (down position), and when the user drags the operation button, the client may obtain a drag position. In addition, for the operation button corresponding to the first operation, the client sets a max drag radius of the operation button, and for the first operation, the client further sets a skill range of the first operation, a ratio relationship between lengths may be obtained as follows with reference to a current position (hero position) of the first virtual object: |drag position−down position|/max drag radius=|focus point−hero position|/skill range, and a position of the focus point of the first operation may be calculated by using the ratio relationship. It can be seen from the ratio relationship between the lengths that the position of the execution range changes with a change of a position of the first virtual object. When the position of the first virtual object changes, a position of the circle center of the execution range also changes, and the position of the execution range also changes.

In another example, the radius of the execution range is a condition radius, and the condition radius changes according to different conditions during running of an application. For example, a size of the radius may be in a positive correlation or a negative correlation with a quantity of executions of the first operation. In an actual application, the condition may be flexibly set according to an actual situation. This is not limited in this embodiment of the disclosure.

In this embodiment of the disclosure, after displaying a user interface, the client may obtain an execution range of a first operation in real time, and update a position of the execution range according to a change of position information of a first virtual object and a change of an operation button corresponding to the first operation touched by the user; or after receiving a trigger instruction of a first operation, the client may obtain an execution range of the first operation. This is not limited in this embodiment of the disclosure.

Operation 130. Offset, in response to a density of a plurality of second virtual objects in the execution range meeting a first condition, a logical position of at least one second virtual object in the plurality of second virtual objects, to obtain an offset logical position of the at least one second virtual object, the logical position being a position used when a logical layer processes the second virtual object.

In this embodiment of the disclosure, when the execution range of the first operation includes a plurality of second virtual objects, the client may determine a density of the plurality of second virtual objects (hereinafter referred to as the second virtual objects) in the execution range, the density being used for indicating distribution of the second virtual objects. Generally, when the density is relatively low, distances between the second virtual objects are relatively large, and distribution of the second virtual objects in the execution range is relatively sparse; and when the density is relatively high, the distances between the second virtual objects are relatively small, distribution of the second virtual objects in the execution range is relatively dense, and position overlapping or the like may occur. When the density of the second virtual objects meets a first condition, the client offsets logical positions of the second virtual objects. A manner of determining the first condition is not limited in this embodiment of the disclosure, and the first condition is preset by a developer or a user; or the first condition is determined by the client according to the first operation in real time.

It can be learned from the foregoing analysis that the density is associated with the distance between the second virtual objects. Therefore, in this embodiment of the disclosure, by determining the distance between the second virtual objects, a manner of determining the density of the second virtual objects is provided. In an example, there are n second virtual objects, n being an integer greater than 1. After operation 120, the method further includes: determining a distance between every two second virtual objects in the n second virtual objects; and determining, in response to a distance that is less than a first distance being present in the distances, that the density meets the first condition.

When determining distances between the n second virtual objects, the client calculates, for each second virtual object in n second virtual objects, distances between each second virtual object and other second virtual objects, the other second virtual objects being second virtual objects other than a corresponding second virtual object in the n second virtual objects. Further, the client may determine a distance between every two second virtual objects in the n second virtual objects, and determine, when a distance that is less than a first distance exists in the distances, that a density of the second virtual objects meets a first condition, that is, when one distance that is less than the first distance exists in the distances, it is considered that the second virtual objects in the execution range are relatively dense, and logical positions of the second virtual objects need to be offset, to distinguish the logical positions of the second virtual objects.

A manner of determining the first distance is not limited in this embodiment of the disclosure. In some embodiments, the first distance is preset by a user or a developer; or the first distance is determined by the client according to the first operation in real time. For example, the method further includes: obtaining an operation effect corresponding to the first operation, the operation effect being an effect produced by the first operation; and determining the first distance according to the operation effect. The client may obtain an operation effect corresponding to the first operation and determine the first distance in real time according to the operation effect. The operation effect is an effect produced by the first operation and is used for indicating a range on which the first operation may be acted and/or a quantity of virtual objects, or the like. The first distance is determined in real time according to the first operation, and sensitivity of triggering the offsetting may be dynamically adjusted according to the first operation, to prevent the client from triggering the offsetting according to single and fixed sensitivity, thereby improving the flexibility of the client. For example, when the operation effect of the first operation is to generate an effect on a single virtual object, a relatively large first distance may be set, and sensitivity of triggering the offsetting is relatively high. In this way, a target virtual object may be more accurately selected from the second virtual objects (e.g., without a user's input or intervention). In another example, when the operation effect of the first operation is to generate an effect on virtual objects in a range, a relatively small first distance may be set, to reduce the sensitivity of the offsetting. This prevents the client from always triggering the offsetting with high sensitivity and reduces processing overheads.

When determining that the density of the second virtual objects in the execution range meets the first condition, the client offsets the logical positions of the second virtual objects, the logical position of the second virtual object being a position used when a logical layer of the client processes the second virtual object. For a description of the offsetting, reference is made to the following method embodiment. Details are not described again. To avoid relatively large changes of positions of the second virtual objects displayed in the user interface during the offsetting, which may affect an interface display effect, in an example, interface positions of the second virtual objects do not change with changes of the logical positions. That is, when the client offsets the logical positions of the second virtual objects, and when users corresponding to the second virtual objects do not control the second virtual objects to move, the interface positions of the second virtual objects do not change. The interface position of the second virtual object is a position used when a representation layer of the client processes the second virtual object. Generally, a change of the logical position of the second virtual object does not change a position of the second virtual object in the user interface, and a change of the interface position of the second virtual object changes the position of the second virtual object in the user interface. In addition, generally, due to a relatively fast processing speed of the client, the offsetting of the logical position of the second virtual object may be a processing operation completed within moments. Therefore, the moving and control of the user corresponding to the second virtual object may be ignored.

Based on the technical solution of the disclosure, a person skilled in the art may easily derive another technical solution for determining the density. However, these all fall within the protection scope of the disclosure. For example, the client obtains a quantity of second virtual objects within the execution range or a preset range; and determines, in response to the quantity being greater than a quantity threshold, that the density meeting the first condition. The preset range is a range preset for determining the density, and the preset range falls within the execution range and is smaller than the execution range; or the preset range includes the execution range and is larger than the execution range. Both a position relationship and a range size relationship between the preset range and the execution range are not limited in this embodiment of the disclosure.

Operation 140. Select a target virtual object corresponding to the first operation (e.g., or a target virtual object on which the first operation is to be performed) from the plurality of second virtual objects based on the offset logical position of the at least one second virtual object.

After offsetting the logical positions of the second virtual objects, the client may obtain offset logical positions of the second virtual objects and select a target virtual object corresponding to the first operation from the second virtual objects based on the offset logical positions.

The target virtual object is a virtual object on which the first operation is acted. For example, when the first operation is an attack skill, the target virtual object is a virtual object attacked by the function skill. There may be one or more target virtual objects. Different maximum quantities of target virtual objects may be set for different operations (for example, different skills). For example, if a maximum quantity of target virtual objects corresponding to an operation is set to 1, it indicates that the operation may act on only one target virtual object at most and may produce an effect on the one target virtual object. In another example, if a maximum quantity of target virtual objects corresponding to an operation is set to x (x is greater than 1), it indicates that the operation may act on x target virtual objects at most and may produce an effect on the x target virtual objects.

Reference information used when the client selects the target virtual object is not limited in this embodiment of the disclosure. The client may directly select the target virtual object based on the offset logical position of the second virtual object; or the client may select the target virtual object with reference to another reference information, for example, a life value, an energy value, an attacked state, a level value, or the like of the second virtual object in addition to the offset logical position of the second virtual object.

In an example, operation 140 includes: obtaining a center position of the execution range of the first operation; determining distances between the offset logical positions of the second virtual objects and the center position; and determining a second virtual object of which the distance meets a second condition as the target virtual object.

A center position of the execution range of the first operation may be alternatively referred to as an operation effect center of the first operation. When the execution range of the first operation has different expression forms, the center position also has different expression forms. For example, when the execution range of the first operation is a circular region, the center position is a circle center of the circular region; when the execution range of the first operation is a rectangular region, the center position is a focus point of diagonal lines of the rectangular region; and when the execution range of the first operation is a fan-shaped region, the center position is a central axis of the fan-shaped region. In this embodiment of the disclosure, a function effect of the first operation corresponding to the center position of the execution range is strongest. For example, when the first operation is an attack skill, an attack effect in the center position of the execution range is strongest; and when the first operation is a skill of increasing an amount of health, an effect of increasing the amount of health in the center position of the execution range is strongest. The target virtual object on which the first operation is acted is selected according to the distances between the offset logical positions of the second virtual objects and the center position, so that the first operation may achieve a relatively good function effect.

In this embodiment of the disclosure, the second condition used for selecting the target virtual object may be preset by a user or a developer. In some embodiments, the second condition includes that the distance is a minimum distance; or the distance is less than a distance threshold. This is not limited in this embodiment of the disclosure. In some embodiments, the client determines the second condition according to the operation effect of the first operation. For example, when the operation effect of the first operation is to generate an effect on a single virtual object, the client sets the second condition to include that the distance is the minimum distance; and when the operation effect of the first operation is to generate an effect on virtual objects in a range, the client sets the second condition to include that the distance is less than the distance threshold.

Figure 4:
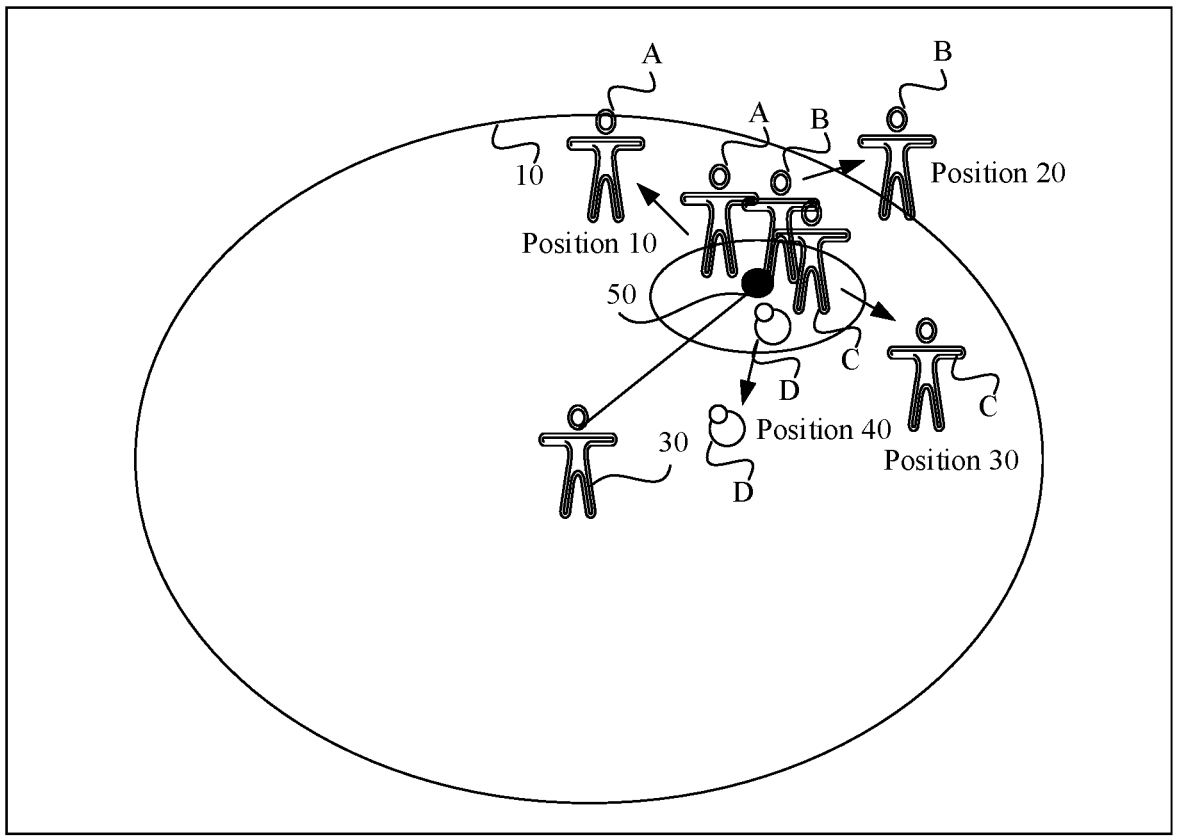
FIG. 4 is a schematic diagram of offsetting a logical position according to an embodiment of the disclosure.

For example, as shown in FIG. 4, an execution range 10 of the first operation includes four second virtual objects, which are an object A, an object B, an object C, and an object D respectively. It is assumed that a distance between every two of the object A, the object B, the object C, and the object D is less than the first distance, the client determines to offset all the four second virtual objects. It is assumed that after the offset processing is performed, offset logical positions of the four second virtual objects are a position 10, a position 20, a position 30, and a position 40 respectively. It is assumed that a center position of the execution range 10 is 50, the client calculates distances between the position 50 and the position 10, the position 20, the position 30, as well as the position 40 respectively, and determines a second virtual object corresponding to a minimum distance in the distances as the target virtual object. For example, if a distance between the position 10 and the position 50 is smallest, the object A is determined as the target virtual object.

Based on the foregoing, according to the technical solution provided in this embodiment of the disclosure, an execution range of an operation of a virtual object controlled by a user is obtained, and when a density of virtual objects for which the operation may take effect and that are included in the execution range meets a specific condition, logical positions of the virtual objects are offset, to avoid a case that the client cannot distinguish the virtual objects due to overlapping of positions of the virtual objects. After the logical positions are offset, the client selects, based on offset logical positions from the virtual objects, a target virtual object on which the operation is acted. After the logical positions are offset, distances between the virtual objects are large enough to avoid position overlapping. Therefore, it is ensured that the client may distinguish the virtual objects, so that the target virtual object selected by the client matches a requirement of the user. In addition, in this embodiment of the disclosure, when the virtual objects are distributed densely, the client offsets the logical positions of the virtual objects to ensure that the virtual objects may be distinguished, so that the user is prevented from spending much time to select the execution range of the operation for ensuring that the target virtual object selected by the client from the execution range matches expectation of the user, thereby reducing operation time costs of the user and improving the operation efficiency.

In addition, according to the technical solution provided in this embodiment of the disclosure, interface positions of the virtual objects for which the operation may take effect do not change with a change of the logical positions, so that when the client offsets the logical positions of the virtual objects, and when the users that control the virtual objects do not control the virtual objects to move, positions of the virtual objects displayed in the user interface do not change, to prevent a relatively large change of the interface positions of the virtual objects during offset from affecting an interface display effect. In the technical solution provided in this embodiment of the disclosure, a display effect of the user interface is improved.

In addition, according to the technical solution provided in this embodiment of the disclosure, distances between the virtual objects and a center position of the execution range are determined based on offset logical positions of the virtual objects for which the operation may take effect, and a virtual object of which a distance meets a condition is determined as the target virtual object. Because the center position of the execution range is generally a position in which a function effect of the operation is strongest, in this embodiment of the disclosure, a virtual object relatively close to the position in which the function effect of the operation is strongest may be determined as an acted object of the operation in such a manner of selecting the target virtual object, to ensure that the operation plays an optimal function effect.

A process in which the client offsets the logical position of the second virtual object is described below.

In an example embodiment, there are n second virtual objects, n being an integer greater than 1. Operation 130 includes the following operations (1) and (2).

(1) Determine an offset direction of an $i^{th}$ second virtual object in the n second virtual objects, and determine an offset distance of the $i^{th}$ second virtual object, the offset direction being a direction further away from other second virtual objects, and i being a positive integer less than or equal to n.

For an $i^{th}$ second virtual object in the n second virtual objects, it is assumed that distances between the $i^{th}$ second virtual object and other second virtual objects are less than a first distance, the client may determine that a density of the second virtual objects in the execution range meets a first condition, the other second virtual objects being second virtual objects other than the $i^{th}$ second virtual object in the n second virtual objects. Because a factor causing the relatively dense second virtual objects is that the distances between the $i^{th}$ second virtual object and the other second virtual objects are less than the first distance, the client determines to offset a logical position of the $i^{th}$ second virtual object. That is, the client offsets logical positions of second virtual objects that cause relatively dense second virtual objects in the execution range in the n second virtual objects.

When the client determines to offset the logical position of the $i^{th}$ second virtual object, the client needs to determine an offset direction and an offset distance of the $i^{th}$ second virtual object. The offset direction of the $i^{th}$ second virtual object is a direction further away from the other second virtual objects, that is, the client offsets the $i^{th}$ second virtual object to make the $i^{th}$ second virtual object move outwards, to achieve an effect of reducing the density of the second virtual objects, thereby resolving the problem of overlapping of positions of the second virtual objects. The offset distance of the $i^{th}$ second virtual object refers to a distance length by which the logical position of the $i^{th}$ second virtual object needs to be offset. After the $i^{th}$ second virtual object is offset, a distance between an offset logical position of the $i^{th}$ second virtual object and the logical position of the $i^{th}$ second virtual object before the offset is the offset distance.

This embodiment of the disclosure provides several manners of determining the offset direction and the offset distance of the $i^{th}$ second virtual object, and a description is made below.

In an example, the determining an offset direction of an $i^{th}$ second virtual object includes: determining repulsive virtual objects corresponding to the $i^{th}$ second virtual object; obtaining repulsive forces of the repulsive virtual objects to the $i^{th}$ second virtual object; and determining a direction of a resultant force of the repulsive forces of the repulsive virtual objects to the $i^{th}$ second virtual object as the offset direction of the $i^{th}$ second virtual object.

The repulsive virtual objects are virtual objects that cause the dense second virtual objects together with the $i^{th}$ second virtual object. In this embodiment of the disclosure, the repulsive virtual objects include other second virtual objects of which distances from the $i^{th}$ second virtual object are less than the first distance. After determining the repulsive virtual objects, the client may obtain repulsive forces of the repulsive virtual objects to the $i^{th}$ second virtual object. A magnitude of the repulsive force is associated with attribute information of the repulsive virtual object, the attribute information including at least one of the following: a distance between the repulsive virtual object and the $i^{th}$ second virtual object, a category to which the repulsive virtual object belongs, a life value of the repulsive virtual object, an energy value of the repulsive virtual object, and the like. A direction of the repulsive force is a direction from the repulsive virtual object to the $i^{th}$ second virtual object. After determining the repulsive forces of the repulsive virtual objects to the $i^{th}$ second virtual object, the client may determine a resultant force of the repulsive forces, and then determine a direction of the resultant force as the offset direction of the $i^{th}$ second virtual object, to achieve an effect of scattering the second virtual objects outwards.

Figure 5:
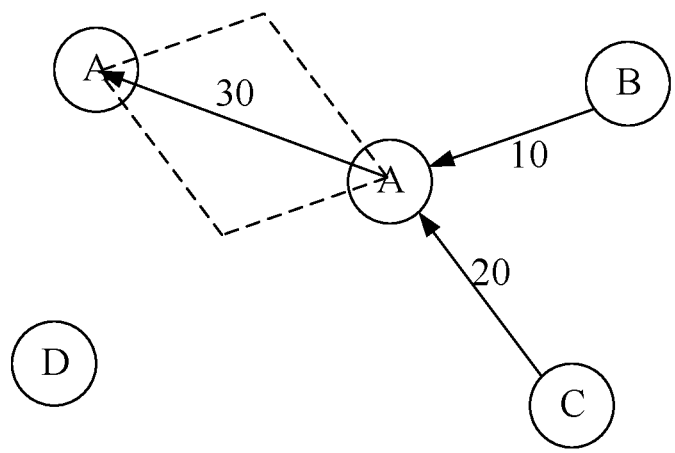
FIG. 5 is a schematic diagram of determining an offset direction according to an embodiment of the disclosure.

FIG. 5 is a schematic diagram of determining an offset direction according to an embodiment of the disclosure. As shown in FIG. 5, there are four second virtual objects in the execution range, which are respectively denoted as an object A, an object B, an object C, and an object D. For the object A in the four second virtual objects, it is assumed that both a distance between the object A and the object B and a distance between the object A and the object C are less than the first distance, and a distance between the object A and the object D is greater than the first distance. In such a case, the client determines the object B and the object C as repulsive virtual objects, obtains a repulsive force 10 of the object B to the object A and a repulsive force 20 of the object C to the object A respectively, determines a resultant force 30 according to the repulsive force 10 and the repulsive force 20, and then determines a direction of the resultant force 30 as an offset direction of the object A.

In another example, the determining an offset direction of an $i^{th}$ second virtual object includes: obtaining a center position of the execution range; and determining a direction from the center position to the $i^{th}$ second virtual object as the offset direction of the $i^{th}$ second virtual object.

In an example embodiment, an operation effect of the first operation is that strength of a function effect of the first operation gradually decreases away from a center position toward an outside. In this case, the client may first obtain a center position of the execution range of the first operation, and determine a direction from the center position to the $i^{th}$ second virtual object as the offset direction of the $i^{th}$ second virtual object. For example, when the execution range of the first operation is a circular region, the offset direction is a direction from a circle center to the $i^{th}$ second virtual object; and when the execution range of the first operation is a rectangular region, the offset direction is a direction from an intersection of diagonal lines to the $i^{th}$ second virtual object.

In still another example, the determining an offset direction of an $i^{th}$ second virtual object includes: obtaining a central axis of the execution range; and determining a direction opposite to a direction of the $i^{th}$ second virtual object relative to the central axis as the offset direction of the $i^{th}$ second virtual object.

In an example embodiment, the operation effect of the first operation is that the strength of the function effect of the first operation gradually decreases away from the central axis toward two sides. In this case, the client may first obtain a central axis of the execution range of the first operation and determine a direction opposite to a direction of the $i^{th}$ second virtual object relative to the central axis as the offset direction of the $i^{th}$ second virtual object. For example, the direction of the $i^{th}$ second virtual object relative to the central axis may be a direction of a vertical line drawn from the $i^{th}$ second virtual object to the central axis. For example, when the execution range of the first operation is a fan-shaped region, the fan-shaped region corresponds to a central axis in which a function effect of the first operation is strongest, and the offset direction of the $i^{th}$ second virtual object is a direction opposite to a vertical line direction from the $i^{th}$ second virtual object to the central axis.

In an example, the determining an offset distance of the $i^{th}$ second virtual object includes: obtaining a category to which the $i^{th}$ second virtual object belongs; and determining the offset distance of the $i^{th}$ second virtual object according to the category to which the $i^{th}$ second virtual object belongs.

The client may obtain a category to which the $i^{th}$ second virtual object belongs while determining the $i^{th}$ second virtual object, and the category to which the $i^{th}$ second virtual object belongs may also be referred to as an object type of the $i^{th}$ second virtual object. The client may classify the second virtual objects according to forms of the second virtual objects, or may classify the second virtual objects according to volumes of the second virtual objects, or may classify the second virtual objects according to another reference information. This is not limited in this embodiment of the disclosure. For example, when the client classifies the second virtual objects according to the forms of the second virtual objects, the categories to which the second virtual objects belong include: a human form, an animal form, a cartoon form, and the like.

The client may determine the offset distance of the $i^{th}$ second virtual object according to the category to which the $i^{th}$ second virtual object belongs. In this embodiment of the disclosure, for different categories of the second virtual objects, the client may preset offset distances corresponding to the categories, for example, when the second virtual objects include the human form and the animal form, an offset distance is set to 10 m for the human form, and an offset distance is set to 5 m for the animal form. After determining the category to which the $i^{th}$ second virtual object belongs, the client queries a preset correspondence between categories of second virtual objects and offset distances, and determines the offset distance of the $i^{th}$ second virtual object. For example, when the $i^{th}$ second virtual object is in the human form, the client determines that the offset distance is 10 m.

In this embodiment of the disclosure, the client may set a fixed offset distance (X) for the second virtual objects of the categories, and then separately set an additional offset distance (Z) for the second virtual objects of the categories. In this way, during determining of the offset distance of the $i^{th}$ second virtual object, if the category to which the $i^{th}$ second virtual object belongs may be determined, a sum (X+Y) of the fixed offset distance and the additional offset distance corresponding to the belonged category is determined as the offset distance of the $i^{th}$ second virtual object. If in some cases, the client cannot determine the category to which the $i^{th}$ second virtual object belongs, the client may directly determine the fixed offset distance (X) as the offset distance of the $i^{th}$ second virtual object, so that the client may determine the offset distance of the $i^{th}$ second virtual object normally in any case.

In another example, the determining an offset distance of the $i^{th}$ second virtual object includes: obtaining state information of the $i^{th}$ second virtual object; and determining the offset distance of the $i^{th}$ second virtual object according to the state information of the $i^{th}$ second virtual object.

The state information is used for indicating a current state of the $i^{th}$ second virtual object. In some embodiments, the state information includes at least one of the following: a life value, an energy value, a current attacked state, and a level value. The offset distance is determined according to the state information of the $i^{th}$ second virtual object, and the offset distance may match a state of the $i^{th}$ second virtual object. Therefore, when the state information indicates that the $i^{th}$ second virtual object is easier to produce a corresponding effect for the first operation, a smaller offset distance is determined, so that the client selects the $i^{th}$ second virtual object more likely when selecting the target virtual object subsequently. For example, when the first operation is an attack skill, the state information of the $i^{th}$ second virtual object indicates that a current life value and a current energy value of the $i^{th}$ second virtual object are relatively low, so that the client determines that the $i^{th}$ second virtual object is easier to be consumed by the attack skill of the first virtual object, and further determines a relatively small offset distance, to more likely select the $i^{th}$ second virtual object subsequently.

In another example, the determining an offset distance of the $i^{th}$ second virtual object includes: obtaining a quantity of repulsive virtual objects corresponding to the $i^{th}$ second virtual object; and determining the offset distance of the $i^{th}$ second virtual object according to the quantity of repulsive virtual objects.

For a description of the repulsive virtual object, reference is made to the foregoing method embodiment. Details are not described again. When the client determines that the $i^{th}$ second virtual object needs to be offset, the client may obtain repulsive virtual objects corresponding to the $i^{th}$ second virtual object. In addition, the client may further obtain a quantity of repulsive virtual objects, and then determine the offset distance of the $i^{th}$ second virtual object according to the quantity. In some embodiments, a quantity of repulsive virtual objects is in a positive correlation with the offset distance, that is, a larger quantity of repulsive virtual objects indicates a larger offset distance. The offset distance is determined according to the quantity of repulsive virtual objects, so that an offset process of the logical position of the $i^{th}$ second virtual object is more in place, thereby preventing the logical positions of the second virtual objects from being offset for a plurality of times. For example, the $i^{th}$ second virtual object corresponds to a relatively large quantity of repulsive virtual objects. In this case, it may be determined that distribution of the second virtual objects in the execution range is denser. To effectively reduce the density of the second virtual objects, a relatively large offset distance may be set, so that the logical position of the $i^{th}$ second virtual object is offset as far as possible in one operation, to reduce processing overheads.

Referring back to FIG. 3, operation 130 further includes the following operation: (2) Move a logical position of the $i^{th}$ second virtual object along the offset direction by the offset distance, to obtain an offset logical position of the $i^{th}$ second virtual object.

After determining the offset direction and the offset distance of the $i^{th}$ second virtual object, the client may control the $i^{th}$ second virtual object to move along the offset direction by the offset distance, and further obtain an offset logical position of the $i^{th}$ second virtual object.

In an example embodiment, it is ensured that after the logical position of the $i^{th}$ second virtual object is offset, the density of the second virtual objects is reduced, and the target virtual object may be accurately selected, after a logical position of the $i^{th}$ second virtual object is moved along the offset direction by the offset distance. To this end, the method further includes: obtaining a distance between the offset logical position of the $i^{th}$ second virtual object and the first virtual object; obtaining an offset angle in response to the distance being greater than a second distance; performing, in response to the offset angle being less than an angle threshold, operations again from the operations of determining an offset direction of an $i^{th}$ second virtual object and determining an offset distance of the $i^{th}$ second virtual object; and obtaining the offset logical position of the $i^{th}$ second virtual object in response to the offset angle being greater than or equal to the angle threshold.

After offsetting the $i^{th}$ second virtual object, the client obtains a distance between the offset logical position of the $i^{th}$ second virtual object and the first virtual object; and determines, when the distance is greater than or equal to a second distance, that the logical position of the $i^{th}$ second virtual object does not need to be offset, and further determines an offset angle when the distance is less than the second distance. A manner of determining the second distance is not limited in this embodiment of the disclosure. The second distance is preset by a user or a developer, and for different first virtual objects, the second distances may be the same or may be different; or the second distance is determined by the client according to attribute information of the first virtual object in real time, the attribute information including at least one of the following: a life value, a level value, an energy value, and a belonged category.

Figure 6:
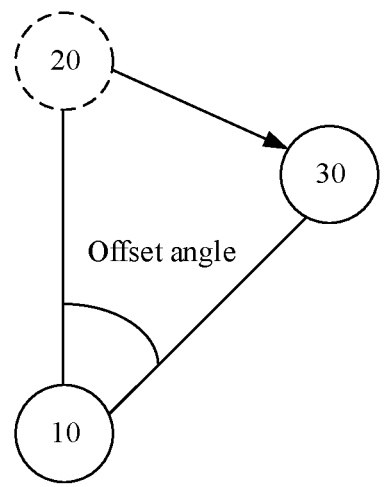
FIG. 6 is a schematic diagram of determining an offset angle according to an embodiment of the disclosure.

The offset angle is an angle of the $i^{th}$ second virtual object relative to the first virtual object before and after the offset, and the offset angle is an angle of the logical position of the $i^{th}$ second virtual object relative to a logical position of the first virtual object before and after the offset. FIG. 6 is a schematic diagram of determining an offset angle according to an embodiment of the disclosure. As shown in FIG. 6, the client may obtain a direction from a logical position 10 of the first virtual object to a logical position 20 of the $i^{th}$ second virtual object before the offset, the direction being referred to as a first direction; and the client may further obtain a direction from the logical position 10 of the first virtual object to an offset logical position 30 of the $i^{th}$ second virtual object, the direction being referred to as a second direction. The offset angle is an angle between the first direction and the second direction.

When the offset angle is greater than or equal to the angle threshold, the client determines that the logical position of the $i^{th}$ second virtual object does not need to be offset again; but when the offset angle is less than the angle threshold, the client determines that the logical position of the $i^{th}$ second virtual object needs to be offset again, and the client performs operations again from the operations of determining an offset direction and an offset distance of the $i^{th}$ second virtual object, and the client determines an offset direction and an offset distance of the offset logical position of the $i^{th}$ second virtual object. A manner of determining the angle threshold is not limited in this embodiment of the disclosure. The angle threshold may be preset by a user or a developer, and for different second virtual objects, the angle thresholds may be the same or may be different; or the angle threshold may be determined by the client in real time according to categories to which the second virtual objects belong.

Figure 7:
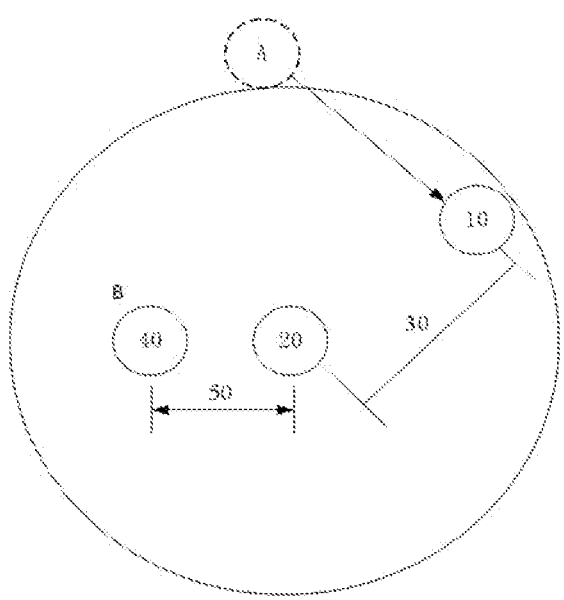
FIG. 7 is a schematic diagram of a logical position before and after an offset according to an embodiment of the disclosure.

The client may also determine a distance between a first virtual object and a logical position of a second virtual object on which position offset is not performed in the n second virtual objects while determining the distance between the offset logical position of the $i^{th}$ second virtual object and the first virtual object, and determine, when the distance is greater than the second distance, that the second virtual object on which position offset is not performed needs to be offset. FIG. 7 is a schematic diagram of a logical position before and after an offset according to an embodiment of the disclosure. As shown in FIG. 7, the second virtual objects include two virtual objects, which are an object A and an object B respectively. In this case, the client offsets the object A, but does not offset the object B. When determining distances between the second virtual objects and the first virtual object, the client determines a distance 30 between an offset logical position 10 of the object A and a logical position 20 of the first virtual object and determines a distance 50 between a logical position 40 of the object B and the logical position 20 of the first virtual object. When the distance 30 is less than or equal to the second distance, it is determined that the offset logical position of the object A does not need to be offset again. When the distance 50 is less than or equal to the second distance, it is determined that the logical position of the object B does not need to be offset.

In this embodiment of the disclosure, to avoid the logical positions of the second virtual objects being offset excessively and thereby reduce processing overheads, a maximum value is set for a quantity of times of re-execution. In an example, the method further includes: obtaining a quantity of times of re-execution; and offsetting the logical position of the $i^{th}$ second virtual object when the quantity of times of re-execution is equal to or less than a quantity threshold of times, to obtain the offset logical position of the $i^{th}$ second virtual object. The quantity threshold of times may be preset by a user or a developer; or is determined by the client according to a processing capability of a running terminal in real time. For example, for a terminal with a strong processing capability, a relatively large quantity threshold of times is set; and for a terminal with a weak processing capability, a relatively small quantity threshold of times is set. This is not limited in this embodiment of the disclosure.

Based on the foregoing, according to the technical solution provided in this embodiment of the disclosure, for a virtual object in virtual objects for which an operation may take effect, an offset direction of the virtual object is determined as a direction further away from other virtual objects, so that the client offsets the virtual objects in an effect of scattering the virtual objects outwards, to achieve an effect of reducing a density of the virtual objects, thereby resolving the problem of overlapping of positions of the virtual objects. In addition, according to the technical solution provided in this embodiment of the disclosure, logical positions of virtual objects that cause a relatively high density among the virtual objects are offset, to resolve a problem of the relatively high density in a targeted manner, thereby achieving a better solution effect.

In addition, according to the technical solution provided in this embodiment of the disclosure, after the logical positions of the virtual objects are offset, it is further detected whether offsetting of the logical positions achieves the effect of reducing the density. When the effect of reducing the density is not achieved, logical positions of virtual objects that cause the relatively high density are offset continuously in a cycle manner until the density of the virtual objects decreases to a required requirement. In this embodiment of the disclosure, it may be ensured that the density of the virtual objects is reduced effectively. In addition, in this embodiment of the disclosure, when the logical positions of the virtual objects that cause the relatively high density are offset continuously in a cycle manner, a maximum quantity of cycles may be set to avoid the logical positions offset excessively and thus reduce processing overheads.

Figure 8:
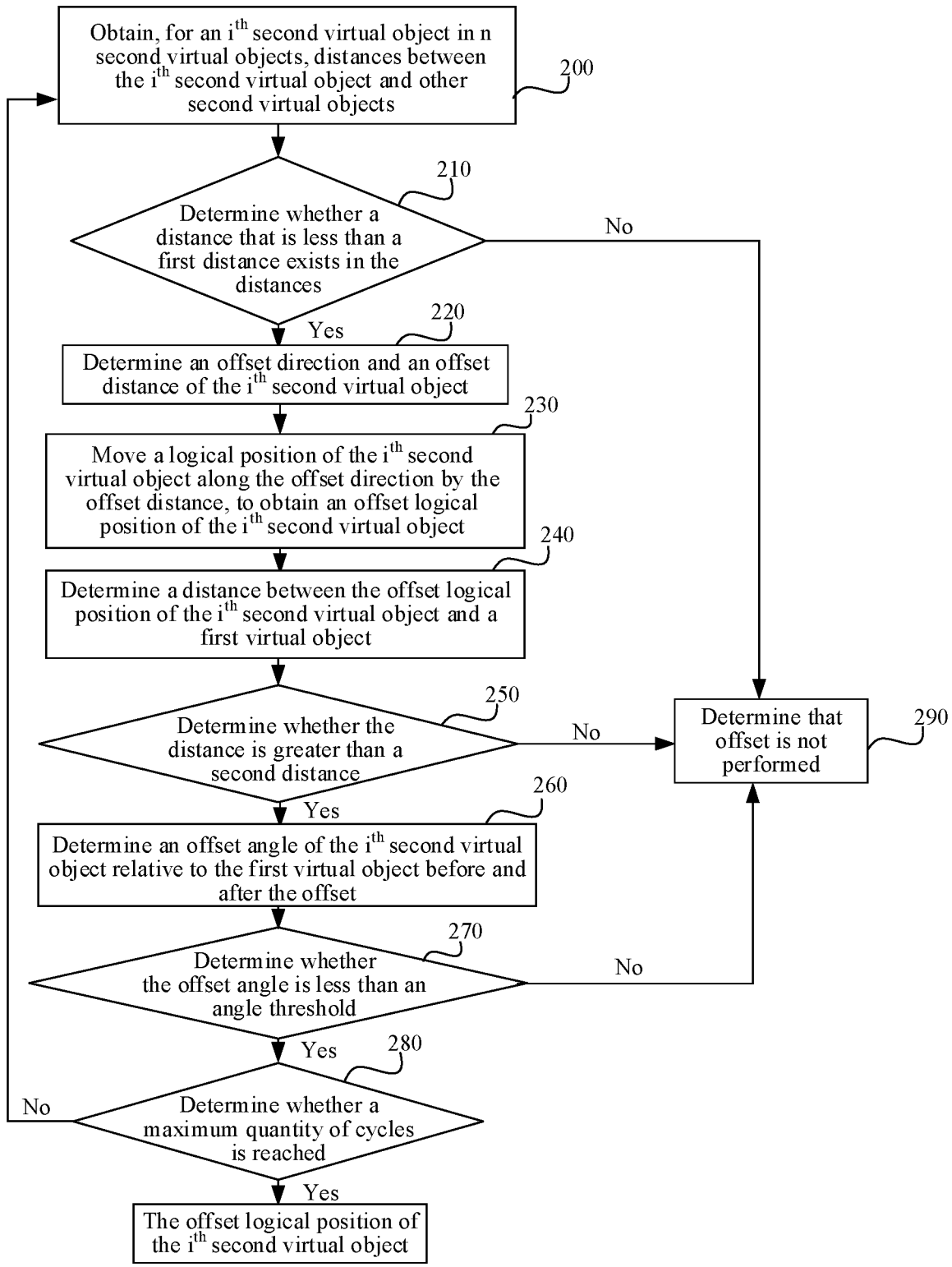
FIG. 8 is a flowchart of an offsetting process according to an embodiment of the disclosure.

FIG. 8 is a flowchart of offsetting a second virtual object according to an embodiment of the disclosure. The method is applicable to a client of the application, for example, applicable to the client (hereinafter referred to as the "client") installed on the terminal 10 in the application run environment shown in FIG. 1. The method may include the following operations (200 to 290).

Operation 200. Obtain, for an $i^{th}$ second virtual object in n second virtual objects, distances between the $i^{th}$ second virtual object and other second virtual objects. The client may obtain a distance between every two second virtual objects in n second virtual objects. For ease of description, in an embodiment shown in FIG. 8, an $i^{th}$ second virtual object in the n second virtual objects is used as an example for description, and for an offset process of other second virtual objects, reference may be made to the embodiment shown in FIG. 8.

Operation 210. Determine whether a distance that is less than a first distance exists in the distances. The first distance may be preset by a user or a developer, or may be determined by the client in real time. Operation 220 is performed if the distance that is less than the first distance exists in the distances; and operation 290 is performed if the distance that is less than the first distance does not exist in the distances.

Operation 220. Determine an offset direction and an offset distance of the $i^{th}$ second virtual object. The offset direction is a direction further away from other second virtual objects, and the offset distance is a distance by which a logical position of the $i^{th}$ second virtual object needs to be moved during offsetting.

Operation 230. Move a logical position of the $i^{th}$ second virtual object along the offset direction by the offset distance, to obtain an offset logical position of the $i^{th}$ second virtual object. After determining an offset direction and an offset distance, the client offsets the $i^{th}$ second virtual object according to the offset direction and the offset distance.

Operation 240. Determine a distance between the offset logical position of the $i^{th}$ second virtual object and a first virtual object. The client may determine a distance between an offset logical position of the $i^{th}$ second virtual object and a logical position of a first virtual object.

Operation 250. Determine whether the distance is greater than a second distance. The second distance may be preset by a user or a developer, or may be determined by the client in real time. Operation 260 is performed when the distance is greater than the second distance; and operation 290 is performed when the distance is less than or equal to the second distance.

Operation 260. Determine an offset angle of the $i^{th}$ second virtual object relative to the first virtual object before and after the offset. The client may obtain a direction from the logical position of the first virtual object to a logical position of the $i^{th}$ second virtual object before the offset, the direction being denoted as a first direction; and the client may further obtain a direction from the logical position of the first virtual object to an offset logical position of the $i^{th}$ second virtual object, the direction being denoted as a second direction. The offset angle is an angle between the first direction and the second direction.

Operation 270. Determine whether the offset angle is less than an angle threshold. The angle threshold may be determined by the client in real time or may be preset by a user or a developer. Operation 280 is performed when the offset angle is less than the angle threshold; and operation 290 is performed when the offset angle is greater than or equal to the angle threshold.

Operation 280. Determine whether a maximum quantity of cycles is reached. Operation 200 is restarted when the maximum quantity of cycles is not reached; and when the maximum quantity of cycles is reached, based on the last offset processing on the logical position of the $i^{th}$ second virtual object, the offset logical position of the $i^{th}$ second virtual object is obtained. In this embodiment of the disclosure, a quantity of cycles of offset may be counted according to a quantity of times of re-execution of operation 200 again.

Operation 290. Determine that offset is not performed. The client obtains the offset logical position of the $i^{th}$ second virtual object while determining that the offset is not performed. When it is determined that the offset is not performed, the offset logical positions of the $i^{th}$ second virtual object are also different according to different determining moments. If it is determined that operation 290 is performed in operation 210, the client does not offset the $i^{th}$ second virtual object actually; and if it is determined that operation 290 is performed in operation 250 or operation 270, the client has offset the $i^{th}$ second virtual object actually.

Operation 200 to operation 230 in the method embodiment shown in FIG. 8 may correspond to operation 130 in the embodiment shown in FIG. 3 and a description of operation 130, and operation 200 to operation 230 may be a further detail description of operation 130. Correspondingly, subsequent operation 240 to operation 290 may also be a further detailed description of operation 140 and operations between operation 130 and operation 140. The introduction and explanation between operations may be complementary to each other.

The following describes apparatus embodiments of the disclosure, which may be used to execute the method embodiments of the disclosure. For details not disclosed in the apparatus embodiments of the disclosure, refer to the method embodiments of the disclosure.

Figure 9:
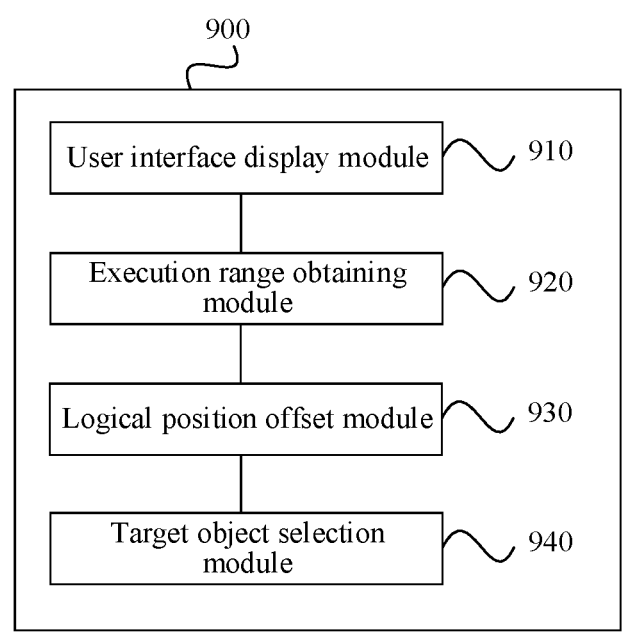
FIG. 9 is a block diagram of a virtual object selection apparatus according to an embodiment of the disclosure.

FIG. 9 is a block diagram of a virtual object selection apparatus according to an embodiment of the disclosure. The apparatus has functions of implementing the virtual object selection method. The functions may be implemented by using hardware, or may be implemented by hardware executing corresponding software. The apparatus may be a terminal or may be set in a terminal. The apparatus 900 may include: a user interface display module 910, an execution range obtaining module 920, a logical position offset module 930, and a target object selection module 940.

The user interface display module 910 is configured to display a user interface, the user interface including an image (e.g., picture) corresponding to a virtual environment and a first virtual object located in the virtual environment.

The execution range obtaining module 920 is configured to obtain an execution range of a first operation of the first virtual object in the virtual environment.

The logical position offset module 930 is configured to offset, in response to a density of a plurality of second virtual objects in the execution range meeting a first condition, a logical position of at least one second virtual object in the plurality of second virtual objects, to obtain an offset logical position of the at least one second virtual object, the logical position being a position used when a logical layer processes the second virtual object.

The target object selection module 940 is configured to select (e.g., without requiring a user's selection operation) a target virtual object corresponding to the first operation from the plurality of second virtual objects based on the offset logical position of the at least one second virtual object.

In an exemplary embodiment, an interface position of the second virtual object does not change according to a change of the logical position of the second virtual object.

Figure 10:
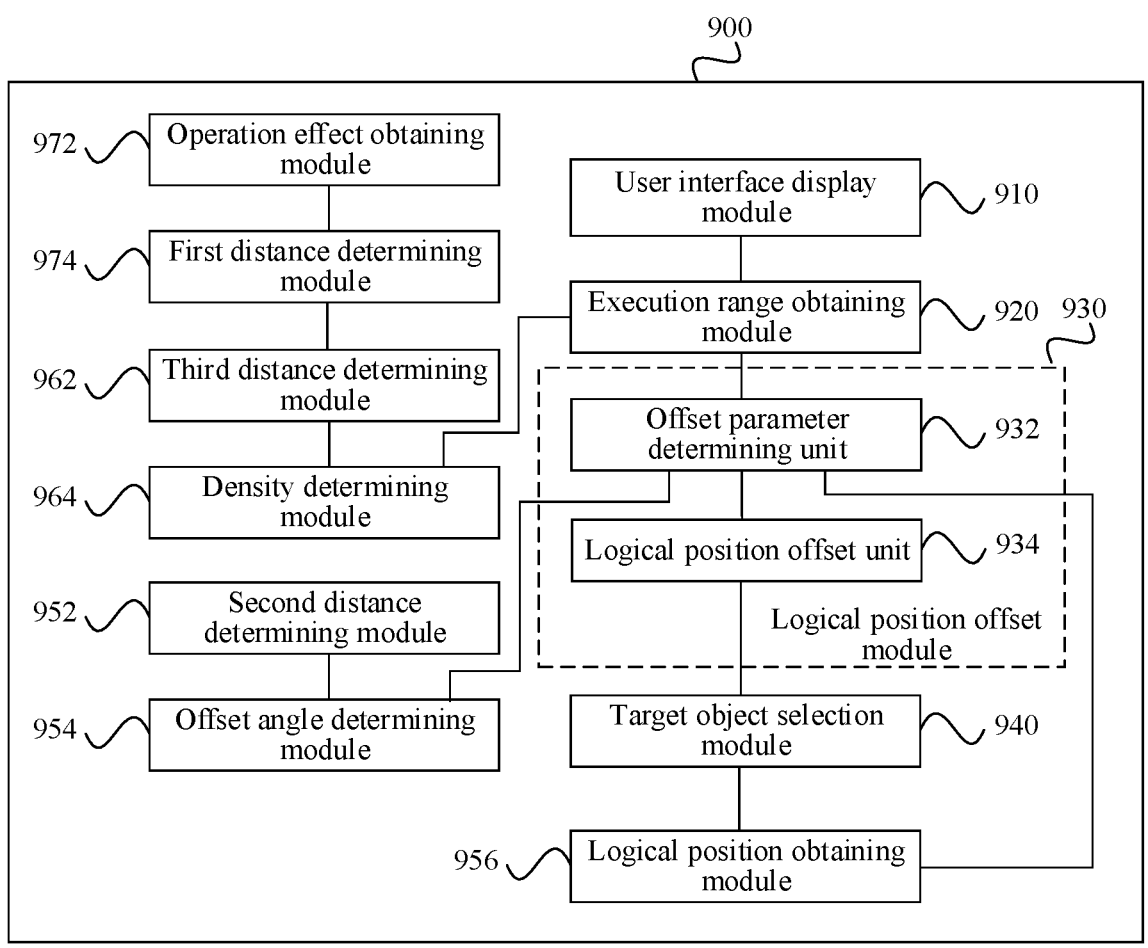
FIG. 10 is a block diagram of a virtual object selection apparatus according to another embodiment of the disclosure.

FIG. 10 is a block diagram of a virtual object selection apparatus according to another embodiment of the disclosure. In an exemplary embodiment, there are n second virtual objects, n being an integer greater than 1; and as shown in FIG. 10, the logical position offset module 930 includes: an offset parameter determining unit 932, configured to determine an offset direction of an $i^{th}$ second virtual object in the n second virtual objects and determine an offset distance of the $i^{th}$ second virtual object, the offset direction being a direction further away from other second virtual objects, and i being a positive integer less than or equal to n; and a logical position offset unit 934, configured to move a logical position of the $i^{th}$ second virtual object along the offset direction by the offset distance, to obtain an offset logical position of the $i^{th}$ second virtual object.

In an exemplary embodiment, as shown in FIG. 10, the offset parameter determining unit 932 is configured to determine repulsive virtual objects corresponding to the $i^{th}$ second virtual object, the repulsive virtual objects including other second virtual objects of which distances from the $i^{th}$ second virtual object are less than a first distance; obtain repulsive forces of the repulsive virtual objects to the $i^{th}$ second virtual object, a magnitude of the repulsive force being associated with attribute information of the repulsive virtual object, and a direction of the repulsive force being a direction from the repulsive virtual object to the $i^{th}$ second virtual object; and determine a direction of a resultant force of the repulsive forces of the repulsive virtual objects to the $i^{th}$ second virtual object as the offset direction of the $i^{th}$ second virtual object.

In an exemplary embodiment, as shown in FIG. 10, the offset parameter determining unit 932 is configured to obtain a center position of the execution range; and determine a direction from the center position to the $i^{th}$ second virtual object as the offset direction of the $i^{th}$ second virtual object.

In an exemplary embodiment, as shown in FIG. 10, the offset parameter determining unit 932 is configured to obtain a central axis of the execution range; and determine a direction opposite to a direction of the $i^{th}$ second virtual object relative to the central axis as the offset direction of the $i^{th}$ second virtual object.

In an exemplary embodiment, as shown in FIG. 10, the offset parameter determining unit 932 is configured to obtain a category to which the $i^{th}$ second virtual object belongs; and determine the offset distance of the $i^{th}$ second virtual object according to the category to which the $i^{th}$ second virtual object belongs.

In an exemplary embodiment, as shown in FIG. 10, the apparatus 900 further includes: a second distance determining module 952, configured to obtain a distance between the offset logical position of the $i^{th}$ second virtual object and the first virtual object; an offset angle determining module 954, configured to obtain an offset angle in response to the distance being greater than a second distance, the offset angle being an angle of the $i^{th}$ second virtual object relative to the first virtual object before and after the offset; the offset parameter determining unit 932, being further configured to perform, in response to the offset angle being less than an angle threshold, operations again from the operations of determining an offset direction of an $i^{th}$ second virtual object and determining an offset distance of the $i^{th}$ second virtual object, an offset direction and an offset distance of the offset logical position of the $i^{th}$ second virtual object being determined when the operations are performed again; and a logical position obtaining module 956, configured to obtain the offset logical position of the $i^{th}$ second virtual object in response to the offset angle being greater than or equal to the angle threshold.

In an exemplary embodiment, there are n second virtual objects, n being an integer greater than 1; and as shown in FIG. 10, the apparatus 900 further includes: a third distance determining module 962, configured to determine a distance between every two second virtual objects in the n second virtual objects; and a density determining module 964, configured to determine, in response to a distance that being less than a first distance exists in the distances, that the density meets the first condition.

In an exemplary embodiment, as shown in FIG. 10, the apparatus 900 further includes: an operation effect obtaining module 972, configured to obtain an operation effect corresponding to the first operation, the operation effect being an effect produced by the first operation; and a first distance determining module 974, configured to determine the first distance according to the operation effect.

In an exemplary embodiment, as shown in FIG. 10, the target object selection module 940 is configured to obtain the center position of the execution range of the first operation; determine distances between the offset logical positions of the second virtual objects and the center position; and determine a second virtual object of which the distance meets a second condition as the target virtual object.

Based on the foregoing, according to the technical solution provided in this embodiment of the disclosure, an execution range of an operation of a virtual object controlled by a user is obtained, and when a density of virtual objects for which the operation may take effect and that are included in the execution range meets a specific condition, logical positions of the virtual objects are offset, to avoid a case that the client cannot distinguish the virtual objects due to overlapping of positions of the virtual objects. After the logical positions are offset, the client selects (e.g., without user input or manipulation), based on offset logical positions from the virtual objects, a target virtual object on which the operation is acted. After the logical positions are offset, distances between the virtual objects are large enough to avoid position overlapping. Therefore, it is ensured that the client may distinguish the virtual objects, so that the target virtual object selected by the client matches a requirement of the user. In addition, in this embodiment of the disclosure, when the virtual objects are distributed densely, the client offsets the logical positions of the virtual objects to ensure that the virtual objects may be distinguished. Accordingly, the user is prevented from spending a relatively long time to select the execution range of the operation for ensuring that the target virtual object selected by the client from the execution range matches expectation of the user, thereby reducing operation time costs of the user and improving the operation efficiency.

When the apparatus provided in the foregoing embodiments implements functions of the apparatus, the division of the foregoing functional modules is merely an example for description. In an actual application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to one conception. For the specific implementation process, reference may be made to the method embodiments, and details are not described herein again.

Figure 11:
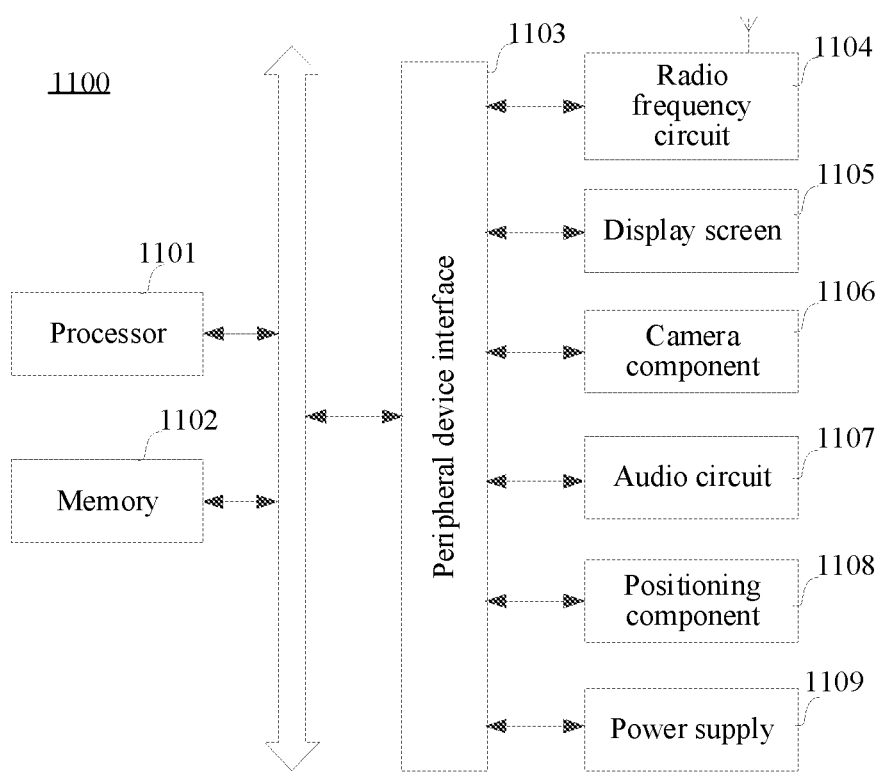
FIG. 11 is a structural block diagram of a terminal according to an embodiment of the disclosure.

FIG. 11 is a structural block diagram of a terminal 1100 according to an embodiment of the disclosure. The terminal 1100 may be an electronic device such as a mobile phone, a tablet computer, a game console, an e-book reader, a multimedia player, a wearable device, or a PC. A client running in the terminal may be configured to implement the virtual object selection method provided in the foregoing embodiments. The terminal may be the terminal 11 in the application run environment shown in FIG. 1.

The terminal 1100 may include a processor 1101 and a memory 1102.

The processor 1101 may include one or more processing cores, and may be, for example, a 4-core processor or an 8-core processor. The processor 1101 may be implemented in at least one hardware form of a digital signal processor (DSP), a field-programmable gate array (FPGA), and a programmable logic array (PLA). The processor 1101 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1101 may be integrated with a graphics processing unit (GPU). The GPU is configured to render and draw content that needs to be displayed on a display screen. In some embodiments, the processor 1101 may further include an artificial intelligence (AI) processor. The AI processor is configured to process computing operations related to machine learning.

The memory 1102 may include one or more computer-readable storage media. The computer-readable storage medium may be non-transient. The memory 1102 may further include a high-speed random access memory and a non-volatile memory, for example, one or more magnetic disk storage devices or flash memory devices.

In some embodiments, the non-transient computer-readable storage medium in the memory 1102 is configured to store at least one instruction, at least one program, a code set, or an instruction set, the at least one instruction, the at least one program, the code set, or the instruction set being configured to be executed by one or more processors to implement the virtual object selection method.

In some embodiments, the terminal 1100 further includes: a peripheral device interface 1103 and at least one peripheral device. The processor 1101, the memory 1102, and the peripheral device interface 1103 may be connected through a bus or a signal cable. Each peripheral device may be connected to the peripheral device interface 1103 by using a bus, a signal cable, or a circuit board. Specifically, the peripheral device includes: at least one of a radio frequency (RF) circuit 1104, a touch display screen 1105, a camera 1107, an audio circuit 1107, a positioning component 1108, and a power supply 1109.

A person skilled in the art would understand that the structure shown in FIG. 11 constitutes no limitation on the terminal 1100, and the terminal may include more or fewer components than those shown in the figure, or some components may be combined, or a different component deployment may be used.

In an exemplary embodiment, a computer-readable storage medium is further provided, the storage medium storing at least one instruction, at least one program, a code set, or an instruction set, the at least one instruction, the at least one program, the code set, or the instruction set, when executed by a processor, implementing the virtual object selection method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product is further provided, the computer program product, when executed by a processor, implementing the virtual object selection method.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the operation numbers described in this specification merely exemplarily show a possible execution sequence of the operations. In some other embodiments, the operations may not be performed according to the number sequence. For example, two operations with different numbers may be performed simultaneously, or two operations with different numbers may be performed according to a sequence contrary to the sequence shown in the figure. This is not limited in the embodiments of the disclosure.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A virtual object selection method, performed by a terminal, the method comprising:
    displaying a user interface, the user interface comprising an image corresponding to a virtual environment and a first virtual object located in the virtual environment;
    obtaining, based on a first operation being performed by the first virtual object, an execution range of the first operation of the first virtual object in the virtual environment;
    offsetting, based on a density of a plurality of second virtual objects in the execution range satisfying a first condition, a logical position of at least one second virtual object in the plurality of second virtual objects, to obtain an offset logical position of the at least one second virtual object, the logical position being a position used in processing the at least one second virtual object in a logical layer; and
    selecting a target virtual object, on which the first operation is performed, from the plurality of second virtual objects based on the offset logical position of the at least one second virtual object.

2. The method according to claim 1, wherein an interface position of the at least one second virtual object does not change according to a change of the logical position of the at least one second virtual object.

3. The method according to claim 1, wherein there are n second virtual objects, n being an integer greater than 1, and the offsetting comprises:
    determining an offset direction of an $i^{th}$ second virtual object in the n second virtual objects and determining an offset distance of the $i^{th}$ second virtual object, the offset direction being a direction away from at least one second virtual object, and i being a positive integer less than or equal to n; and
    moving a logical position of the $i^{th}$ second virtual object along the offset direction by the offset distance, to obtain an offset logical position of the $i^{th}$ second virtual object.

4. The method according to claim 3, wherein the determining the offset direction of the $i^{th}$ second virtual object comprises:
    determining repulsive virtual objects corresponding to the $i^{th}$ second virtual object, the repulsive virtual objects comprising other second virtual objects of which distances from the $i^{th}$ second virtual object are less than a first distance;
    obtaining repulsive forces of the repulsive virtual objects to the $i^{th}$ second virtual object, a magnitude of the repulsive force being associated with attribute information of the repulsive virtual object, and a direction of the repulsive force being a direction from the repulsive virtual object to the $i^{th}$ second virtual object; and
    determining a direction of a resultant force of repulsive forces of the repulsive virtual objects to the $i^{th}$ second virtual object as the offset direction of the $i^{th}$ second virtual object.

5. The method according to claim 3, wherein the determining the offset direction of the $i^{th}$ second virtual object comprises:
    obtaining a center position of the execution range; and
    determining a direction from the center position to the $i^{th}$ second virtual object as the offset direction of the $i^{th}$ second virtual object.

6. The method according to claim 3, wherein the determining the offset direction of the $i^{th}$ second virtual object comprises:
    obtaining a central axis of the execution range; and
    determining a direction opposite to a direction of the $i^{th}$ second virtual object relative to the central axis as the offset direction of the $i^{th}$ second virtual object.

7. The method according to claim 3, wherein the determining the offset distance of the $i^{th}$ second virtual object comprises:
obtaining a category to which the $i^{th}$ second virtual object belongs; and
determining the offset distance of the $i^{th}$ second virtual object according to the category to which the $i^{th}$ second virtual object belongs.

8. The method according to claim 3, further comprising, after the moving the logical position of the $i^{th}$ second virtual object:
obtaining a distance between the offset logical position of the $i^{th}$ second virtual object and the first virtual object;
obtaining, based on the distance being greater than a second distance, an offset angle, which is an angle formed by logical positions of the $i^{th}$ second virtual object, before and after an offset, relative to the first virtual object;
performing, based on the offset angle being less than an angle threshold, another offsetting on the logical position of the $i^{th}$ second virtual object by again determining the offset direction of the $i^{th}$ second virtual object and determining the offset distance of the $i^{th}$ second virtual object; and
obtaining a new offset logical position of the $i^{th}$ second virtual object based on the offset angle, obtained with respect to the another offsetting, being greater than or equal to the angle threshold.

9. The method according to claim 1, wherein there are n second virtual objects, n being an integer greater than 1; and
after the obtaining the execution range of the first operation, the method further comprises:
determining distances between every two second virtual objects in the n second virtual objects; and
based on a distance that is less than a first distance being included in the distances, determining that the density satisfies the first condition.

10. The method according to claim 9, further comprising obtaining an operation effect corresponding to the first operation, the operation effect being an effect produced by the first operation; and
determining the first distance according to the operation effect.

11. The method according to claim 1, wherein the selecting the target virtual object comprises:
obtaining a center position of the execution range of the first operation;
determining distances between offset logical positions of the plurality of second virtual objects and the center position; and
determining a second virtual object of which the distance satisfies a second condition as the target virtual object.

12. A terminal, comprising a processor and a memory, the memory storing at least one instruction, at least one program, a code set, or an instruction set, the at least one instruction, the at least one program, the code set, or the instruction set being executable by the processor to implement the method according to claim 1.

13. A virtual object selection apparatus, comprising:
at least one memory configured to store program code; and
at least one processor configured to read the program code and operate as instructed by the program code, the program code comprising:
user interface display code configured to cause the at least one processor to display a user interface, the user interface comprising an image corresponding to a virtual environment and a first virtual object located in the virtual environment;
execution range obtaining code configured to cause the at least one processor to, based on a first operation being performed by the first virtual object, obtain an execution range of the first operation of the first virtual object in the virtual environment;
logical position offset code configured to cause the at least one processor to offset, based on a density of a plurality of second virtual objects in the execution range satisfying a first condition, a logical position of at least one second virtual object in the plurality of second virtual objects, to obtain an offset logical position of the at least one second virtual object, the logical position being a position used in processing the at least one second virtual object in a logical layer; and
target object selection code configured to cause the at least one processor to select a target virtual object, on which the first operation is performed, from the plurality of second virtual objects based on the offset logical position of the at least one second virtual object.

14. The apparatus according to claim 13, wherein the user interface display code is further configured to cause the at least one processor to control such that an interface position of the at least one second virtual object does not change according to a change of the logical position of the at least one second virtual object.

15. The apparatus according to claim 13, wherein there are n second virtual objects, n being an integer greater than 1, and the logical position offset code comprises:
determination sub-code configured to cause the at least one processor to determine an offset direction of an $i^{th}$ second virtual object in the n second virtual objects and determine an offset distance of the $i^{th}$ second virtual object, the offset direction being a direction away from at least one second virtual object, and i being a positive integer less than or equal to n; and
movement sub-code configured to cause the at least one processor to move a logical position of the $i^{th}$ second virtual object along the offset direction by the offset distance, to obtain an offset logical position of the $i^{th}$ second virtual object.

16. The apparatus according to claim 15, wherein the determining the determination sub-code is configured to cause the at least one processor to determine the offset direction of the $i^{th}$ second virtual object by:
determining repulsive virtual objects corresponding to the $i^{th}$ second virtual object, the repulsive virtual objects comprising other second virtual objects of which distances from the $i^{th}$ second virtual object are less than a first distance;
obtaining repulsive forces of the repulsive virtual objects to the $i^{th}$ second virtual object, a magnitude of the repulsive force being associated with attribute information of the repulsive virtual object, and a direction of the repulsive force being a direction from the repulsive virtual object to the $i^{th}$ second virtual object; and
determining a direction of a resultant force of repulsive forces of the repulsive virtual objects to the $i^{th}$ second virtual object as the offset direction of the $i^{th}$ second virtual object.

17. The apparatus according to claim 15, wherein the determination sub-code is configured to cause the at least one processor to determine the offset direction of the $i^{th}$ second virtual object by:
obtaining a center position of the execution range; and determining a direction from the center position to the $i^{th}$ second virtual object as the offset direction of the $i^{th}$ second virtual object.

18. The apparatus according to claim 15, wherein the determination sub-code is configured to cause the at least one processor to determine the offset direction of the $i^{th}$ second virtual object by:
  obtaining a central axis of the execution range; and
  determining a direction opposite to a direction of the $i^{th}$ second virtual object relative to the central axis as the offset direction of the $i^{th}$ second virtual object.

19. The apparatus according to claim 15, wherein the determination sub-code is configured to cause the at least one processor to determine the offset direction of the $i^{th}$ second virtual object by:
  obtaining a category to which the $i^{th}$ second virtual object belongs; and
  determining the offset distance of the $i^{th}$ second virtual object according to the category to which the $i^{th}$ second virtual object belongs.

20. A non-transitory computer-readable storage medium, storing at least one program executable by at least one processor to perform:
  displaying a user interface, the user interface comprising an image corresponding to a virtual environment and a first virtual object located in the virtual environment;
  obtaining, based on a first operation being performed by the first virtual object, an execution range of the first operation of the first virtual object in the virtual environment;
  offsetting, based on a density of a plurality of second virtual objects in the execution range satisfying a first condition, a logical position of at least one second virtual object in the plurality of second virtual objects, to obtain an offset logical position of the at least one second virtual object, the logical position being a position used in processing the at least one second virtual object in a logical layer; and
  selecting a target virtual object, on which the first operation is performed, from the plurality of second virtual objects based on the offset logical position of the at least one second virtual object.

* * * * *